United States Patent
Zhang et al.

(10) Patent No.: US 9,883,512 B2
(45) Date of Patent: Jan. 30, 2018

(54) METHOD AND APPARATUS FOR CONTROLLING UPLINK TRANSMIT POWER OF UE, UE, AND BASE STATION

(71) Applicant: Huawei Technologies Co., Ltd., Shenzhen (CN)

(72) Inventors: Xingwei Zhang, Beijing (CN); Zhiyu Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 14/997,929

(22) Filed: Jan. 18, 2016

(65) Prior Publication Data

US 2016/0135193 A1    May 12, 2016

Related U.S. Application Data

(63) Continuation of application No. PCT/CN2014/081038, filed on Jun. 27, 2014.

(30) Foreign Application Priority Data

Jul. 19, 2013    (CN) .......................... 2013 1 0306810

(51) Int. Cl.
*H04W 72/04* (2009.01)
*H04W 52/04* (2009.01)
(Continued)

(52) U.S. Cl.
CPC ....... *H04W 72/0473* (2013.01); *H04W 52/04* (2013.01); *H04W 52/146* (2013.01);
(Continued)

(58) Field of Classification Search
CPC ... H04J 11/0059; H04W 16/32; H04W 56/00; H04W 48/10; H04W 72/042; H04W 48/16; H04L 5/0094; H04L 5/0007
See application file for complete search history.

(56) References Cited

U.S. PATENT DOCUMENTS

2011/0235582 A1* 9/2011 Chen .................... H04W 52/243
                                                                370/328
2011/0274064 A1* 11/2011 Luo ..................... H04W 52/325
                                                                370/329

(Continued)

FOREIGN PATENT DOCUMENTS

| CN | 101720122 A | 6/2010 |
|----|----|----|
| CN | 102823306 A | 12/2012 |
| EP | 2569993 A1 | 3/2013 |
| WO | 2013008406 A1 | 1/2013 |

*Primary Examiner* — Jung-Jen Liu
(74) *Attorney, Agent, or Firm* — Slater Matsil, LLP

(57) ABSTRACT

Embodiments of the present invention disclose a method and an apparatus for controlling uplink transmit power of UE, UE, and a base station, and the method includes: determining subframe configuration information, where the subframe configuration information is used to indicate base stations corresponding to all subframes in a radio frame; determining static power control parameters corresponding to all the base stations; determining a TPC adjustment value of a current subframe; and determining uplink transmit power of the current subframe according to a static power control parameter corresponding to a base station corresponding to the current subframe and the TPC adjustment value of the current subframe. In the embodiments of the present invention, when UE is connected to at least two base stations, control over uplink transmit power can be implemented when the UE sends data to different base stations.

22 Claims, 5 Drawing Sheets

(51) Int. Cl.
*H04W 52/14* (2009.01)
*H04W 52/22* (2009.01)
*H04W 52/24* (2009.01)
*H04W 52/36* (2009.01)

(52) U.S. Cl.
CPC ....... *H04W 52/228* (2013.01); *H04W 52/244* (2013.01); *H04W 52/248* (2013.01); *H04W 52/362* (2013.01)

(56) References Cited

U.S. PATENT DOCUMENTS

| | | | |
|---|---|---|---|
| 2012/0236767 A1* | 9/2012 | Zhu | H04W 52/325 370/280 |
| 2013/0114562 A1* | 5/2013 | Seo | H04W 52/146 370/329 |
| 2014/0050182 A1* | 2/2014 | Iwai | H04W 52/325 370/329 |
| 2014/0126440 A1* | 5/2014 | Frank | H04W 52/06 370/311 |
| 2014/0192727 A1* | 7/2014 | Liu | H04W 28/18 370/329 |
| 2014/0226499 A1* | 8/2014 | Soliman | H04W 52/243 370/252 |
| 2015/0103800 A1* | 4/2015 | Seo | H04W 56/00 370/330 |
| 2015/0215877 A1* | 7/2015 | Ahn | H04W 72/0413 455/522 |

* cited by examiner

METHOD AND APPARATUS FOR CONTROLLING UPLINK TRANSMIT POWER OF UE, UE, AND BASE STATION

This application is a continuation of International Application No. PCT/CN2014/081038, filed on Jun. 27, 2014, which claims priority to Chinese Patent Application No. 201310306810.5, filed on Jul. 19, 2013, both of which are hereby incorporated by reference in their entireties.

TECHNICAL FIELD

The present invention relates to the communications field, and in particular, to a method and an apparatus for controlling uplink transmit power of user equipment (UE), UE, and a base station.

BACKGROUND

The Release 10/11/12 (Rel-10/11/12) of the 3rd Generation Partnership Project Long Term Evolution Advanced (LTE-A) is a technical enhancement of the Release 8/9 (Rel-8/9) of the 3rd Generation Partnership Project Long Term Evolution (LTE). An LTE-A system has a higher bandwidth requirement than an LTE system, and supports a peak data rate up to 1 Gbits/s. In order to meet a requirement of the LTE-A, in the LTE-A system, a carrier aggregation (CA) technology is used as a method for expanding system bandwidth by the LTE-A system, and a multiple-input multiple-output (MIMO) enhancement technology and an adaptive technology are frequently used, so as to improve a data rate and system performance.

In the LTE-A Rel-12, an enhancement for a hotspot area becomes a popular topic. The hotspot area includes an indoor scene and an outdoor scene, and is covered by multiple low-power micro base stations to form a small cell network (SCN). An indoor micro base station supports only user equipment (UE) that moves at a low speed, and an outdoor micro base station supports UE that moves at a low speed and UE that moves at a moderate speed. Neither of the two micro base stations supports UE that moves at a high speed. Generally, it is considered that UE moves at a low speed when a movement speed of the UE is 0-15 km/h, the UE moves at a moderate speed when the movement speed of the UE is 15-60 km/h, the UE moves at a high speed when the movement speed of the UE is above 60 km/h. Because the micro base station serves only UE that moves at a moderate speed and UE that moves at a low speed, and quality of a radio channel between the micro base station and the UE is relatively good, overheads of pilot and control signaling may be reduced. In addition, coverage of the micro base station is less than that of a macro base station, and a quantity of UE served by the micro base station is also less than a quantity of UE served by the macro base station, so that the overheads of pilot and control signaling may be further reduced from this perspective.

In the LTE-A Rel-12 release, the Small Cell Enhancement Work Item (SCE WI) introduces a feature of dual connectivity. That is, UE may be simultaneously connected to at least two base stations, for example, may be simultaneously connected to a macro base station and a micro base station, where the macro base station and the micro base station may be on a same frequency or may be on different frequencies. Because coverage of a micro base station is small, if a movement speed of UE is relatively high, the UE is prone to frequently enter from coverage of one micro base station to coverage of another micro base station, causing frequent handovers between base stations. Dual connectivity may allow the UE to keep connected to a macro base station and a micro base station simultaneously. Content related to mobility management and a real-time service, such as voice over Internet Protocol (VoIP), are provided by the macro base station for the UE, and the micro base station provides only a data service for the UE. The dual connectivity may prevent a case in which the UE is frequently handed over between base stations.

When the UE is connected to at least two base stations, and if the UE has only a single-link transmission capability in an uplink direction, different data cannot be separately sent to the macro base station and the micro base station at the same time. For the UE, a time division multiplexing (TDM) method may be used, and data is sent to different base stations at different time. However, because uplink transmit power required for sending data to the micro base station and uplink transmit power required for sending data to the macro base station have a relatively large difference, the prior art does not disclose how to implement control over uplink transmit power of the UE in the case of dual connectivity.

SUMMARY

Embodiments of the present invention provide a method and an apparatus for controlling uplink transmit power of UE, UE, and a base station; therefore, when the UE is connected to at least two base stations, control over uplink transmit power can be implemented when the UE sends data to different base stations.

According to a first aspect, an embodiment of the present invention provides a method for controlling uplink transmit power of user equipment UE, where the UE is connected to at least two base stations, and the method further includes:

determining subframe configuration information, where the subframe configuration information is used to indicate base stations corresponding to all subframes in a radio frame, and determining static power control parameters corresponding to all the base stations;

determining a transmit power control (TPC) adjustment value of a current subframe; and determining uplink transmit power of the current subframe according to a static power control parameter corresponding to a base station corresponding to the current subframe and the TPC adjustment value of the current subframe.

With reference to the foregoing first aspect, in a first possible implementation manner of the first aspect, the determining uplink transmit power of the current subframe according to a static power control parameter corresponding to a base station corresponding to the current subframe and the TPC adjustment value of the current subframe includes:

determining a power offset of the current subframe according to the TPC adjustment value of the current subframe; and determining the uplink transmit power of the current subframe according to the static power control parameter corresponding to the base station corresponding to the current subframe and the power offset of the current subframe.

With reference to the foregoing first possible implementation manner of the first aspect, in a second possible implementation manner of the first aspect, the TPC adjustment value is a TPC cumulative value, and the determining a power offset of the current subframe according to the TPC adjustment value of the current subframe includes:

determining the power offset of the current subframe according to an offset of a previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

With reference to the foregoing first possible implementation manner of the first aspect, in a third possible implementation manner of the first aspect, the TPC adjustment value is a TPC cumulative value, and the determining a power offset of the current subframe according to the TPC adjustment value of the current subframe includes:

when the current subframe and a previous subframe of the current subframe are corresponding to different base stations, determining the power offset of the current subframe according to a power offset of the previous subframe of the current subframe, the TPC cumulative value of the current subframe, and a preset first static adjustment value; or when the current subframe and a previous subframe of the current subframe are corresponding to a same base station, determining the power offset of the current subframe according to a power offset of the previous subframe of the current subframe and the TPC cumulative value of the current subframe.

With reference to the foregoing first possible implementation manner of the first aspect, in a fourth possible implementation manner of the first aspect, the TPC adjustment value is a TPC cumulative value, and the determining a power offset of the current subframe according to the TPC adjustment value of the current subframe includes:

when the current subframe and a previous subframe of the current subframe are corresponding to different base stations, determining the power offset of the current subframe according to a power offset of a previous subframe that is of the current subframe and is corresponding to a same base station as the current subframe, and the TPC cumulative value of the current subframe; or when the current subframe and a previous subframe of the current subframe are corresponding to a same base station, determining the power offset of the current subframe according to a power offset of the previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

With reference to the foregoing first possible implementation manner of the first aspect, in a fifth possible implementation manner of the first aspect, the TPC adjustment value is a TPC cumulative value, and the determining a power offset of the current subframe according to the TPC adjustment value of the current subframe includes:

when the current subframe and a previous subframe of the current subframe are corresponding to different base stations, determining the power offset of the current subframe according to a power offset of a previous subframe that is of the current subframe and is corresponding to a same base station as the current subframe, the TPC cumulative value of the current subframe, and a preset second static adjustment value; or when the current subframe and a previous subframe of the current subframe are corresponding to a same base station, determining the power offset of the current subframe according to a power offset of the previous subframe of the current subframe and the TPC cumulative value of the current subframe.

With reference to the foregoing first possible implementation manner of the first aspect, in a sixth possible implementation manner of the first aspect, the TPC adjustment value is a TPC cumulative value, and the determining a power offset of the current subframe according to the TPC adjustment value of the current subframe includes:

when the current subframe and a previous subframe of the current subframe are corresponding to different base stations, determining the TPC cumulative value of the current subframe as the power offset of the current subframe; or when the current subframe and a previous subframe of the current subframe are corresponding to a same base station, determining the power offset of the current subframe according to a power offset of the previous subframe of the current subframe and the TPC cumulative value of the current subframe.

With reference to the foregoing first possible implementation manner of the first aspect, in a seventh possible implementation manner of the first aspect, the TPC adjustment value is a TPC absolute value, and the determining a power offset of the current subframe according to the TPC adjustment value of the current subframe includes:

determining the TPC absolute value of the current subframe as the power offset of the current subframe.

With reference to the foregoing first possible implementation manner of the first aspect, in an eighth possible implementation manner of the first aspect, when the current subframe and a previous subframe of the current subframe are corresponding to different base stations, the TPC adjustment value is a TPC absolute value; or when the current subframe and a previous subframe of the current subframe are corresponding to a same base station, the TPC adjustment value is a TPC cumulative value; and the determining a power offset of the current subframe according to the TPC adjustment value of the current subframe includes:

when the current subframe and the previous subframe of the current subframe are corresponding to different base stations, determining the TPC absolute value of the current subframe as the power offset of the current subframe;

when the current subframe and the previous subframe of the current subframe are corresponding to a same base station, and a TPC adjustment value of the previous subframe of the current subframe is a TPC absolute value, determining the TPC cumulative value of the current subframe as the power offset of the current subframe; or when the current subframe and the previous subframe of the current subframe are corresponding to a same base station, and a TPC adjustment value of the previous subframe of the current subframe is a TPC cumulative value, determining the power offset of the current subframe according to a power offset of the previous subframe of the current subframe and the TPC cumulative value of the current subframe.

With reference to the foregoing first possible implementation manner of the first aspect, and/or the second possible implementation manner of the first aspect, and/or the third possible implementation manner of the first aspect, and/or the fourth possible implementation manner of the first aspect, and/or the fifth possible implementation manner of the first aspect, and/or the sixth possible implementation manner of the first aspect, and/or the seventh possible implementation manner of the first aspect, and/or the eighth possible implementation manner of the first aspect, in a ninth possible implementation manner of the first aspect, static power control parameters corresponding to different base stations are the same or different.

According to a second aspect, an embodiment of the present invention provides an apparatus for controlling uplink transmit power of user equipment UE, where the UE is connected to at least two base stations, and the apparatus further includes:

an information determining unit, configured to determine subframe configuration information, where the subframe configuration information is used to indicate base stations corresponding to all subframes in a radio frame;

a first determining unit, configured to determine static power control parameters corresponding to all the base stations;

a second determining unit, configured to determine a transmit power control TPC adjustment value of a current subframe; and a third determining unit, configured to: determine, according to the subframe configuration information determined by the information determining unit and the static power control parameters that are corresponding to all the base stations and that are determined by the first determining unit, a static power control parameter corresponding to a base station corresponding to the current subframe; and determine uplink transmit power of the current subframe according to the static power control parameter corresponding to the base station corresponding to the current subframe and the TPC adjustment value that is of the current subframe and that is determined by the second determining unit.

With reference to the foregoing second aspect, in a first possible implementation manner of the second aspect, the third determining unit includes:

a first determining subunit, configured to determine a power offset of the current subframe according to the TPC adjustment value of the current subframe; and a second determining subunit, configured to: determine, according to the subframe configuration information determined by the information determining unit and the static power control parameters that are corresponding to all the base stations and that are determined by the first determining unit, the static power control parameter corresponding to the base station corresponding to the current subframe; and determine the uplink transmit power of the current subframe according to the static power control parameter corresponding to the base station corresponding to the current subframe and the power offset of the current subframe.

With reference to the foregoing first possible implementation manner of the second aspect, in a second possible implementation manner of the second aspect, the TPC adjustment value is a TPC cumulative value, and the first determining subunit is specifically configured to:

determine the power offset of the current subframe according to a power offset of a previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

With reference to the foregoing first possible implementation manner of the second aspect, in a third possible implementation manner of the second aspect, the TPC adjustment value is a TPC cumulative value, and the first determining subunit is specifically configured to:

when the current subframe and a previous subframe of the current subframe are corresponding to different base stations, determine the power offset of the current subframe according to a power offset of the previous subframe of the current subframe, the TPC cumulative value of the current subframe, and a preset first static adjustment value; or when the current subframe and a previous subframe of the current subframe are corresponding to a same base station, determine the power offset of the current subframe according to a power offset of the previous subframe of the current subframe and the TPC cumulative value of the current subframe.

With reference to the foregoing first possible implementation manner of the second aspect, in a fourth possible implementation manner of the second aspect, the TPC adjustment value is a TPC cumulative value, and the first determining subunit is specifically configured to:

when the current subframe and a previous subframe of the current subframe are corresponding to different base stations, determine the power offset of the current subframe according to a power offset of a previous subframe that is of the current subframe and is corresponding to a same base station as the current subframe, and the TPC cumulative value of the current subframe; or when the current subframe and a previous subframe of the current subframe are corresponding to a same base station, determine the power offset of the current subframe according to a power offset of the previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

With reference to the foregoing first possible implementation manner of the second aspect, in a fifth possible implementation manner of the second aspect, the TPC adjustment value is a TPC cumulative value, and the first determining subunit is specifically configured to:

when the current subframe and a previous subframe of the current subframe are corresponding to different base stations, determine the power offset of the current subframe according to a power offset of a previous subframe that is of the current subframe and is corresponding to a same base station as the current subframe, the TPC cumulative value of the current subframe, and a preset second static adjustment value; or when the current subframe and a previous subframe of the current subframe are corresponding to a same base station, determine the power offset of the current subframe according to a power offset of the previous subframe of the current subframe and the TPC cumulative value of the current subframe.

With reference to the foregoing first possible implementation manner of the second aspect, in a sixth possible implementation manner of the second aspect, the TPC adjustment value is a TPC cumulative value, and the first determining subunit is specifically configured to:

when the current subframe and a previous subframe of the current subframe are corresponding to different base stations, determine the TPC cumulative value of the current subframe as the power offset of the current subframe; or when the current subframe and a previous subframe of the current subframe are corresponding to a same base station, determine the power offset of the current subframe according to a power offset of the previous subframe of the current subframe and the TPC cumulative value of the current subframe.

With reference to the foregoing first possible implementation manner of the second aspect, in a seventh possible implementation manner of the second aspect, the TPC adjustment value is a TPC absolute value, and the first determining subunit is specifically configured to:

determine the TPC absolute value of the current subframe as the power offset of the current subframe.

With reference to the foregoing first possible implementation manner of the second aspect, in an eighth possible implementation manner of the second aspect, when the current subframe and a previous subframe of the current subframe are corresponding to different base stations, the TPC adjustment value is a TPC absolute value; or when the current subframe and a previous subframe of the current subframe are corresponding to a same base station, the TPC adjustment value is a TPC cumulative value; and the first determining subunit is specifically configured to:

when the current subframe and the previous subframe of the current subframe are corresponding to different base stations, determine the TPC absolute value of the current subframe as the power offset of the current subframe;

when the current subframe and the previous subframe of the current subframe are corresponding to a same base station, and a TPC adjustment value of the previous subframe of the current subframe is a TPC absolute value, determine the TPC cumulative value of the current subframe as the power offset of the current subframe; or when the current subframe and the previous subframe of the current subframe are corresponding to a same base station, and a TPC adjustment value of the previous subframe of the current subframe is a TPC cumulative value, determine the power offset of the current subframe according to a power offset of the previous subframe of the current subframe and the TPC cumulative value of the current subframe.

With reference to the foregoing first possible implementation manner of the second aspect, and/or the second possible implementation manner of the second aspect, and/or the third possible implementation manner of the second aspect, and/or the fourth possible implementation manner of the second aspect, and/or the fifth possible implementation manner of the second aspect, and/or the sixth possible implementation manner of the second aspect, and/or the seventh possible implementation manner of the second aspect, and/or the eighth possible implementation manner of the second aspect, in a ninth possible implementation manner of the second aspect, static power control parameters corresponding to different base stations are the same or different.

According to a third aspect, an embodiment of the present invention provides user equipment UE, where the UE is connected to at least two base stations, and the UE includes:

a processor, configured to: determine subframe configuration information, where the subframe configuration information is used to indicate base stations corresponding to all subframes in a radio frame; determine static power control parameters corresponding to all the base stations; determine a transmit power control TPC adjustment value of a current subframe; and determine uplink transmit power of the current subframe according to a static power control parameter corresponding to a base station corresponding to the current subframe and the TPC adjustment value of the current subframe.

With reference to the foregoing third aspect, in a first possible implementation manner of the third aspect, the processor is specifically configured to: determine a power offset of the current subframe according to the TPC adjustment value of the current subframe; and determine the uplink transmit power of the current subframe according to the static power control parameter corresponding to the base station corresponding to the current subframe and the power offset of the current subframe.

With reference to the foregoing first possible implementation manner of the third aspect, in a second possible implementation manner of the third aspect, the TPC adjustment value is a TPC cumulative value, and the processor is specifically configured to:

determine the power offset of the current subframe according to an offset of a previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

With reference to the foregoing first possible implementation manner of the third aspect, in a third possible implementation manner of the third aspect, the TPC adjustment value is a TPC cumulative value, and the processor is specifically configured to:

when the current subframe and a previous subframe of the current subframe are corresponding to different base stations, determine the power offset of the current subframe according to a power offset of the previous subframe of the current subframe, the TPC cumulative value of the current subframe, and a preset first static adjustment value; or when the current subframe and a previous subframe of the current subframe are corresponding to a same base station, determine the power offset of the current subframe according to a power offset of the previous subframe of the current subframe and the TPC cumulative value of the current subframe.

With reference to the foregoing first possible implementation manner of the third aspect, in a fourth possible implementation manner of the third aspect, the TPC adjustment value is a TPC cumulative value, and the processor is specifically configured to:

when the current subframe and a previous subframe of the current subframe are corresponding to different base stations, determine the power offset of the current subframe according to a power offset of a previous subframe that is of the current subframe and is corresponding to a same base station as the current subframe, and the TPC cumulative value of the current subframe; or when the current subframe and a previous subframe of the current subframe are corresponding to a same base station, determine the power offset of the current subframe according to a power offset of the previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

With reference to the foregoing first possible implementation manner of the third aspect, in a fifth possible implementation manner of the third aspect, the TPC adjustment value is a TPC cumulative value, and the processor is specifically configured to:

when the current subframe and a previous subframe of the current subframe are corresponding to different base stations, determine the power offset of the current subframe according to a power offset of a previous subframe that is of the current subframe and is corresponding to a same base station as the current subframe, the TPC cumulative value of the current subframe, and a preset second static adjustment value; or when the current subframe and a previous subframe of the current subframe are corresponding to a same base station, determine the power offset of the current subframe according to a power offset of the previous subframe of the current subframe and the TPC cumulative value of the current subframe.

With reference to the foregoing first possible implementation manner of the third aspect, in a sixth possible implementation manner of the third aspect, the TPC adjustment value is a TPC cumulative value, and the processor is specifically configured to:

when the current subframe and a previous subframe of the current subframe are corresponding to different base stations, determine the TPC cumulative value of the current subframe as the power offset of the current subframe; or when the current subframe and a previous subframe of the current subframe are corresponding to a same base station, determine the power offset of the current subframe according to a power offset of the previous subframe of the current subframe and the TPC cumulative value of the current subframe.

With reference to the foregoing first possible implementation manner of the third aspect, in a seventh possible implementation manner of the third aspect, the TPC adjustment value is a TPC absolute value, and the processor is specifically configured to:

determine the TPC absolute value of the current subframe as the power offset of the current subframe.

With reference to the foregoing first possible implementation manner of the third aspect, in an eighth possible implementation manner of the third aspect, when the current subframe and a previous subframe of the current subframe are corresponding to different base stations, the TPC adjustment value is a TPC absolute value; or when the current subframe and a previous subframe of the current subframe are corresponding to a same base station, the TPC adjustment value is a TPC cumulative value; and the processor is specifically configured to:

when the current subframe and the previous subframe of the current subframe are corresponding to different base stations, determine the TPC absolute value of the current subframe as the power offset of the current subframe;

when the current subframe and the previous subframe of the current subframe are corresponding to a same base station, and a TPC adjustment value of the previous subframe of the current subframe is a TPC absolute value, determine the TPC cumulative value of the current subframe as the power offset of the current subframe; or when the current subframe and the previous subframe of the current subframe are corresponding to a same base station, and a TPC adjustment value of the previous subframe of the current subframe is a TPC cumulative value, determine the power offset of the current subframe according to a power offset of the previous subframe of the current subframe and the TPC cumulative value of the current subframe.

According to a fourth aspect, an embodiment of the present invention provides a method for controlling uplink transmit power of user equipment UE, where the UE is connected to at least two base stations, and the method further includes:

sending subframe configuration information to the UE, where the subframe configuration information is used to indicate base stations corresponding to all subframes in a radio frame;

sending a static power control parameter of a base station to the UE, where the base station is one base station of the at least two base stations; and sending a transmit power control TPC adjustment value of a current subframe to the UE, so that the UE determines uplink transmit power of the current subframe according to the static power control parameter and the TPC adjustment value, where the current subframe is a subframe that is of subframes of the UE and that is corresponding to the base station.

With reference to the fourth aspect, in a first possible implementation manner of the fourth aspect, the method further includes:

sending, to the UE, static power control parameters of one or more base stations, except the base station, to which the UE is connected.

According to a fifth aspect, an embodiment of the present invention provides an apparatus for controlling uplink transmit power of user equipment UE, where the UE is connected to at least two base stations, and the apparatus includes:

a sending unit, configured to: send subframe configuration information to the UE, where the subframe configuration information is used to indicate base stations corresponding to all subframes in a radio frame; send a static power control parameter of a base station to the UE, where the base station is one base station of the at least two base stations; and send a transmit power control TPC adjustment value of a current subframe to the UE, so that the UE determines uplink transmit power of the current subframe according to the static power control parameter and the TPC adjustment value, where the current subframe is a subframe that is of subframes of the UE and that is corresponding to the base station.

With reference to the foregoing fifth aspect, in a first possible implementation manner of the fifth aspect, the sending unit is further configured to send, to the UE, static power control parameters of one or more base stations, except the base station, to which the UE is connected.

According to a sixth aspect, an embodiment of the present invention provides a base station, including:

a transceiver, configured to: send subframe configuration information to UE, where the subframe configuration information is used to indicate base stations corresponding to all subframes in a radio frame; send a static power control parameter of the base station to the UE; and send a transmit power control TPC adjustment value of a current subframe to the UE, so that the UE determines uplink transmit power of the current subframe according to the static power control parameter and the TPC adjustment value, where the current subframe is a subframe that is of subframes of the UE and that is corresponding to the base station.

With reference to the sixth aspect, in a first possible implementation manner of the sixth aspect, the transceiver is further configured to send, to the UE, static power control parameters of one or more base stations, except the base station, to which the UE is connected.

In the embodiments, subframe configuration information is determined, where the subframe configuration information is used to indicate base stations corresponding to all subframes in a radio frame; static power control parameters corresponding to all the base stations are determined; a TPC adjustment value of a current subframe is determined; uplink transmit power of the current subframe is determined according to a static power control parameter corresponding to a base station corresponding to the current subframe and the TPC adjustment value of the current subframe. Therefore, uplink transmit power of UE in all the subframes can be determined; because all the subframes are corresponding to different base stations, when the UE is connected to at least two base stations, control over the uplink transmit power can be implemented when the UE sends data to different base stations.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

In the LTE-A Rel-12 release, the SCE WI introduces a feature of dual connectivity. That is, UE may be simultaneously connected to at least two base stations, for example, may be simultaneously connected to a macro base station and a micro base station, where the macro base station and the micro base station may be on a same frequency or may be on different frequencies. Because coverage of a micro base station is small, if a movement speed of UE is relatively high, the UE is prone to frequently enter from coverage of one micro base station to coverage of another micro base station, causing frequent handovers. Dual connectivity may allow the UE to keep connected to a macro base station and a micro base station simultaneously. Content related to mobility management and a real-time service, such as voice over Internet Protocol (VoIP), are provided by the macro base station for the UE, and the micro base station provides only a data service for the UE. The dual connectivity may prevent a case in which the UE is frequently handed over between base stations.

Figures 1, 2:
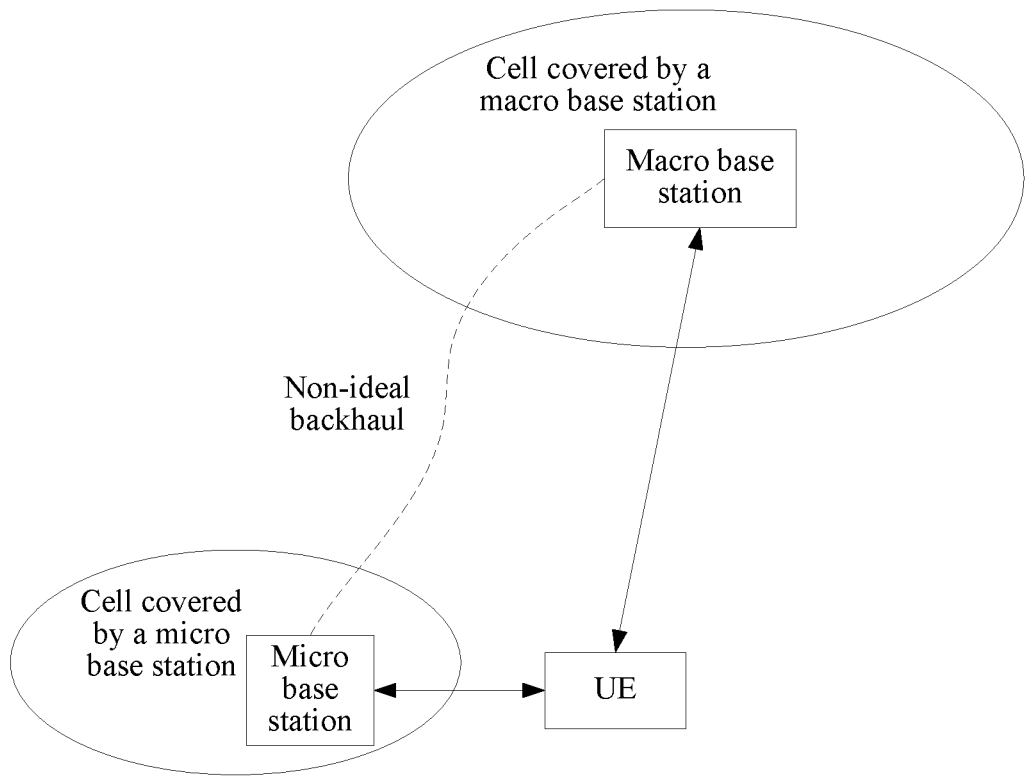
FIG. 1 is a diagram of an architecture in a dual connectivity scenario of UE.
FIG. 2 is an exemplary diagram of a correspondence between a subframe and a base station.

The micro base station is a relatively independent small cell, and a cell range covered by the micro base station is less than a cell range covered by the macro base station. A backhaul (backhaul) connection between the micro base station and the macro base station is not ideal, and a delay may reach 5 ms to 60 ms. If the UE is simultaneously connected to the micro base station and the macro base station, when the UE feeds back uplink data such as uplink control information (UCI) to the micro base station and the macro base station, due to impact of non-ideal backhaul between the micro base station and the macro base station, a delay of information transmission between the micro base station and the macro base station is relatively large, and real-time performance is poor. As a result, the uplink data cannot be fed back by the UE to one base station of the micro base station and the macro base station and then forwarded by the base station to the other base station. Therefore, in a more possible implementation manner, as shown in FIG. 1, the UE separately sends the UCI to the macro base station and the micro base station. The UCI specifically includes a scheduling request (SR), an acknowledgement/a negative acknowledgement (A/N), channel state information (CSI), and the like. The CSI further includes a channel quality indicator (CQI) signal, a precoding matrix indication (PMI) signal, a precoding type indication (PTI) signal, a rank indicator (RI) signal, and the like.

However, for UE that has only a single-link transmission capability in an uplink direction, different uplink data cannot be separately sent to the macro base station and the micro base station at the same time. For such UE, a TDM method may be used, and data is sent to different base stations at different time. For example, as shown in FIG. 2, it may be set that each subframe in a radio frame is corresponding to a base station. For example, subframes 0, 1, 2, 6, and 7 shown in FIG. 2 are corresponding to a micro base station, subframes 3, 4, 5, 8, and 9 are corresponding to a macro base station, and uplink data is sent, in each subframe, to a base station corresponding to the subframe.

However, uplink transmit power required for sending data to the micro base station and uplink transmit power required for sending data to the macro base station have a relatively large difference, and a process of controlling uplink transmit power of the UE in all the subframes is complex. The prior art does not disclose how to implement control over the uplink transmit power of the UE when the UE is connected to at least two base stations.

Therefore, embodiments of the present invention provide a method and an apparatus for controlling uplink transmit power of UE, UE, and a base station; therefore, when the UE is connected to at least two base stations, control over uplink transmit power can be implemented when the UE sends data to different base stations.

First, control over uplink transmit power of UE in LTE-A is described as follows:

In the LTE-A, the uplink transmit power of the UE may be controlled in a manner of combining open-loop control and closed-loop control. Open-loop transmit power control includes two types: static power control and dynamic power control, and closed-loop transmit power control includes only the dynamic power control. The static power control described in the present invention includes a fixed static power control parameter, and also includes a semi-static power control parameter that keeps unchanged within a time period. A network-side device, such as a base station, configures a semi-static power control parameter for the UE, and the semi-static power control parameter keeps unchanged within a time period, so that accuracy of transmit power control is relatively low. On a basis of the open-loop transmit power control, the network-side device may send a transmit power control TPC command to the UE according to feedback information of the UE, and performs dynamic offset adjustment on the uplink transmit power of the UE, so as to implement the closed-loop power control over the uplink transmit power. Transmit power may be more accurately controlled by controlling the uplink transmit power in the manner of combining the open-loop control and the closed-loop control.

In the LTE-A, both a physical uplink control channel (PUCCH) and a physical uplink shared channel (Uplink Shared Channel, PUSCH) have explicit uplink transmit power control formulas, and an uplink transmit power control formula of a sounding reference signal (SRS) is obtained by adding an offset to transmit power of the PUSCH. Specifically, an uplink transmit power control formula of the PUCCH is as follows:

$$P_{PUCCH}(i) = \min\{P_{CMAX}, P_{0\_PUCCH} + PL + h(n_{CQI}, n_{HARQ}) + \Delta_{F\_PUCCH}(F) + g(i)\} [dBm] \quad (1)$$

where $$g(i) = g(i-1) + \sum_{m=0}^{M-1} \delta_{PUCCH}(i - k_m)$$

indicates a transmit power offset of the $i^{th}$ uplink subframe;

$$\sum_{m=0}^{M-1} \delta_{PUCCH}(i - k_m)$$

indicates a transmit power control (transmit power control, TPC) cumulative value of the $i^{th}$ uplink subframe relative to the $(i-1)^{th}$ uplink subframe; $\delta_{PUCCH}$ indicates a closed-loop correction coefficient indicated by a TPC transmit power control command in downlink scheduling signaling DCI Format 1/1A/1B/1D/2/2A/2B or DCI Format 3/3A; $P_{CMAX}$ indicates maximum transmit power; $P_{0\_PUCCH}$ indicates power compensation caused by a quantity of bits of signaling; $\Delta_{F\_PUCCH}(F)$ indicates power adjustment caused by different PUCCH formats; and $h(n_{CQI}, n_{HARQ})$ indicates a quantity of bits of uplink control information (Uplink Control Information, UCI). In a frequency division duplex (Frequency Division Duplex, FDD) mode, M=1 and $k_0$=4.

In a time division duplex (Time Division Duplex, TDD) mode, values of M and $k_m$ are shown in the following Table 1.

TABLE 1

Values of M and values $\{k_0, k_1, \ldots k_{M-1}\}$ of $k_m$ in the TDD mode

| Uplink-downlink parameter | Subframe (Subframe) n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

An uplink transmit power control formula of the PUSCH differs in two cases.

Case 1: If a subframe i has only the PUSCH or is not configured with simultaneous PUCCH and PUSCH transmission, and if there is control signaling, the control signaling is associated on the PUSCH to be sent together with data, and the uplink transmit power control formula of the PUSCH is as follows:

$$P_{PUSCH,c}(i) = \min\begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} \quad (2)$$

Case 2: If a subframe i is configured with simultaneous PUCCH and PUSCH transmission, uplink transmit power of the PUCCH needs to be first calculated according to the foregoing formula (1), and the uplink transmit power control formula of the PUSCH is as follows:

$$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} \quad (3)$$

where $f_c(i)$ indicates a power offset of the $i^{th}$ uplink subframe, and $f_c(i)$ has two calculation manners, which are separately $f_c(i) = f_c(i-1) + \delta_{PUSCH,c}(i-K_{PUSCH})$ and $f_c(i) = \delta_{PUSCH,c}(i-K_{PUSCH})$, where $f_c(i) = f_c(i-1) + \delta_{PUSCH,c}(i-K_{PUSCH})$ is a power offset obtained by performing TPC cumulating on a basis of the $(i-1)^{th}$ uplink subframe, and belongs to cumulating TPC, and $f_c(i) = \delta_{PUSCH,c}(i-K_{PUSCH})$ is an absolute power offset and belongs to absolute TPC; $P_{CMAX,c}(i)$ indicates maximum transmit power of the $i^{th}$ subframe on a c carrier; $\hat{P}_{CMAX,c}(i)$ indicates a linear value of $P_{CMAX,c}(i)$; $\hat{P}_{PUCCH}(i)$ indicates a linear value of $P_{PUCCH}(i)$; $M_{PUSCH,c}(i)$ indicates a quantity of RBs occupied by the PUSCH; $P_{O\_PUSCH,c}(j)$ indicates reference power of the PUSCH; $\alpha_c(j)$ indicates a path loss compensation factor; $\Delta_{TF,c}(i)$ indicates power adjustment caused by different transmission formats; and $PL_c$ indicates a path loss of the c carrier. For the cumulating TPC, the $i^{th}$ subframe relative to the $(i-1)^{th}$ subframe has a TPC cumulative value $\delta_{PUSCH,c}$ $(i-K_{PUSCH})$, where $\delta_{PUSCH,c}$ is a closed-loop correction coefficient indicated by a TPC transmit power control command in uplink scheduling signaling DCI Format 0/4 or DCI Format 3/3A. In the FDD mode, $K_{PUSCH}=4$; in the TDD mode, a value of $K_{PUSCH}$ is shown in the following Table 2.

TABLE 2

A value of $K_{PUSCH}$ in the TDD mode

| TDD UL/DL Configuration | subframe i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Based on the foregoing uplink transmit power control formulas of the PUCCH and the PUSCH, a TPC command is classified into cumulating TPC and absolute TPC. The absolute TPC is used only for the PUSCH, and switching between the two modes for the PUSCH is semi-statically configured for each UE by using RRC signaling. In the cumulating TPC, an eNB instructs, by using the TPC command, the UE to make further adjustment on a basis of previous transmit power, and to add a power step based on a previous power level. A step value may be {−1, +1} dB (carried by a DCI Format 3A) or {−1, 0, 1, 3} dB (carried by a DCI Format 0/1/1A/1B/1D/2/2A/2B/3/4). In the cumulating TPC, adjustment based on a semi-static operating point is not limited in any range. In the absolute TPC, the eNB controls transmit power of the UE by using the TPC command, and independently adds a power compensation signal based on the semi-static operating point. A compensation set is {−4, −1, 1, 4} dB (carried by a DCI Format 0/3/4). In the absolute TPC, setting of the transmit power is independent of a previously received TPC command sequence, and is related only to a lastly received absolute TPC command.

For the cumulating TPC, if the UE already reaches the maximum transmit power, a positive power control instruction is no longer cumulated; if the UE already reaches minimum transmit power, a negative power control instruction is no longer cumulated. In addition, under any one of the following five trigger conditions, the UE resets the power offset, that is, for the PUCCH, g(i)=0; and for the PUSCH, f(i)=0: 1) when an absolute power control instruction of the PUSCH is received; 2) when Po_UE is received; 3) when a random access response message is received; 4) when a cell is handed over; and 5) when an RRC activated state is entered or left.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the following embodiments of the present invention, UE is in dual connectivity, that is, the UE is connected to at least two base stations, and the UE has only a single-link transmission capability.

Figure 3:
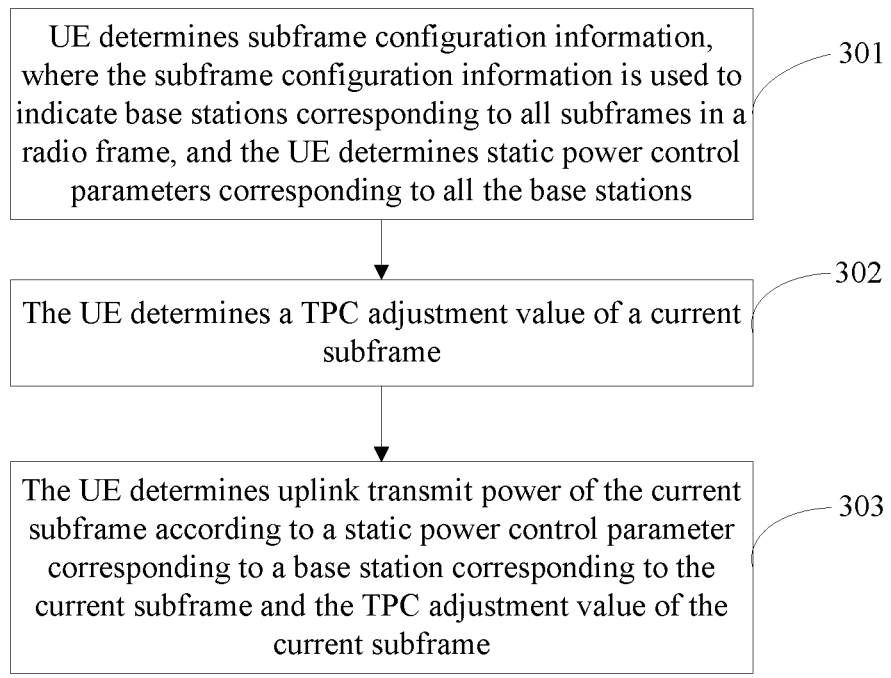
FIG. 3 is a schematic diagram of a first embodiment of a method for controlling uplink transmit power of UE according to the present invention.

Referring to FIG. 3, FIG. 3 is a schematic diagram of a first embodiment of a method for controlling uplink transmit power of UE according to the present invention, and the method includes:

Step 301: UE determines subframe configuration information, where the subframe configuration information is used to indicate base stations corresponding to all subframes in a radio frame, and the UE determines static power control parameters corresponding to all the base stations.

Step 302: The UE determines a TPC adjustment value of a current subframe.

Step 303: The UE determines uplink transmit power of the current subframe according to a static power control parameter corresponding to a base station corresponding to the current subframe and the TPC adjustment value of the current subframe.

In this embodiment, UE determines subframe configuration information, where the subframe configuration information is used to indicate base stations corresponding to all subframes in a radio frame, determines static power control parameters corresponding to all the base stations, determines a TPC adjustment value of a current subframe, and determines uplink transmit power of the current subframe according to a static power control parameter corresponding to a base station corresponding to the current subframe and the TPC adjustment value of the current subframe; therefore, in a case in which the UE is connected to at least two base stations, control over uplink transmit power of the UE is implemented.

Figure 4:
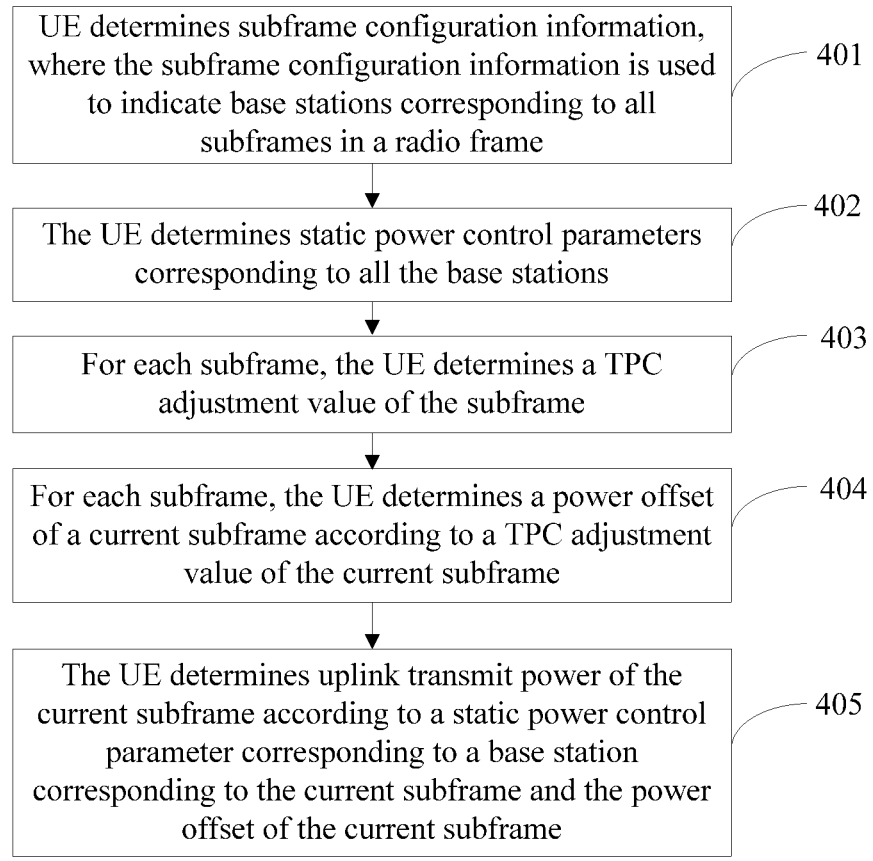
FIG. 4 is a schematic diagram of a second embodiment of a method for controlling uplink transmit power of UE according to the present invention.

Referring to FIG. 4, FIG. 4 is a schematic diagram of a second embodiment of a method for controlling uplink transmit power of UE according to the present invention, and the method includes:

Step 401: UE determines subframe configuration information, where the subframe configuration information is used to indicate base stations corresponding to all subframes in a radio frame.

The subframe configuration information may be sent to the UE by a base station that the UE is connected to. For example, the UE is separately connected to a macro base station and a micro base station, and the subframe configuration information may be sent to the UE by the macro base station or the micro base station, which is not limited herein.

According to the base stations corresponding to all the subframes, the UE sends, in all the subframes, uplink data to the base stations corresponding to the subframes. For example, in FIG. 2, in a subframe numbered 0 of each radio frame, the UE sends uplink data to a micro base station corresponding to the subframe numbered 0; in a subframe numbered 3 of each radio frame, the UE sends uplink data to a macro base station corresponding to the subframe numbered 3.

Step 402: The UE determines static power control parameters corresponding to all the base stations.

The static power control parameters corresponding to all the base stations may be the same or different. The static power control parameter may be directly preset in the UE, or may be indicated to the UE by a base station. If the static power control parameter is indicated to the UE by the base station, the static power control parameter may be indicated to the UE by the macro base station and/or the micro base station.

For example, assuming that the UE is simultaneously connected to a macro base station A and a micro base station B, the static power control parameter may be indicated to the UE by the macro base station A or the micro base station B, or may be separately indicated to the UE by the macro base station A and the micro base station B.

Step 403: For each subframe, the UE determines a TPC adjustment value of the subframe.

The TPC adjustment value may be a TPC cumulative value or a TPC absolute value.

TPC adjustment values of all the subframes may be dynamically indicated to the UE by the base station that the UE is connected to. Specifically, a base station corresponding to a subframe may indicate a TPC adjustment value of the subframe to the UE.

Step 404: For each subframe, the UE determines a power offset of a current subframe according to a TPC adjustment value of the current subframe.

In a first possible implementation manner, the TPC adjustment value is a TPC cumulative value, and the determining, by the UE, a power offset of a current subframe according to a TPC adjustment value of the current subframe may include:

determining, by the UE, the power offset of the current subframe according to a power offset of a previous subframe of the current subframe and the TPC cumulative value of the current subframe.

Specifically, the power offset of the current subframe=the power offset of the previous subframe of the current subframe+the TPC cumulative value of the current subframe.

When the current subframe and the previous subframe of the current subframe are corresponding to different base stations, for example, for subframe 3, subframe 6, and subframe 8 in FIG. 2, one subframe of a current subframe and a previous subframe of the current subframe is corresponding to a macro base station and the other subframe is corresponding to a micro base station, transmit power of the UE in one of the two subframes is greatly different from that in the other subframe. Therefore, an adjustment amplitude of transmit power of the current subframe is relatively large. When the current subframe and the previous subframe of the current subframe are corresponding to a same base station, for example, for subframes 1, 2, 4, 5, 7, and 9 in FIG. 2, two subframes are corresponding to a same base station, the transmit power of the UE in one of the two subframes is slightly different from that in the other subframe. Therefore, the adjustment amplitude of the transmit power of the current subframe is relatively small. Therefore, assuming that a value range of the TPC cumulative value of the current subframe is M1 when the current subframe and the previous subframe of the current subframe are corresponding to different base stations, and that the value range of the TPC cumulative value of the current subframe is M2 when the current subframe and the previous subframe of the current subframe are corresponding to a same base station, M1 is greater than M2.

In a second possible implementation manner, the TPC adjustment value is a TPC cumulative value, and the determining, by the UE, a power offset of a current subframe according to a TPC adjustment value of the current subframe may include:

when determining that the current subframe and a previous subframe of the current subframe are corresponding to different base stations, determining, by the UE, the power offset of the current subframe according to a power offset of the previous subframe of the current subframe, the TPC cumulative value of the current subframe, and a preset first static adjustment value; or when determining that the current subframe and a previous subframe of the current subframe are corresponding to a same base station, determining, by the UE, the power offset of the current subframe according to a power offset of the previous subframe of the current subframe and the TPC cumulative value of the current subframe.

Specifically, when the current subframe and the previous subframe of the current subframe are corresponding to different base stations, the power offset of the current subframe=the power offset of the previous subframe of the current subframe+the TPC cumulative value of the current subframe+the first static adjustment value; or when the current subframe and the previous subframe of the current subframe are corresponding to a same base station, the power offset of the current subframe=the power offset of the previous subframe of the current subframe+the TPC cumulative value of the current subframe.

In a third possible implementation manner, the TPC adjustment value is a TPC cumulative value, and the determining, by the UE, a power offset of a current subframe according to a TPC adjustment value of the current subframe may include:

when the current subframe and a previous subframe of the current subframe are corresponding to different base stations, determining, by the UE, the power offset of the current subframe according to a power offset of a previous subframe that is of the current subframe and is corresponding to a same base station as the current subframe, and the TPC cumulative value of the current subframe; or when the current subframe and a previous subframe of the current subframe are corresponding to a same base station, determining, by the UE, the power offset of the current subframe according to a power offset of the previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

In a fourth possible implementation manner, the TPC adjustment value is a TPC cumulative value, and the determining, by the UE, a power offset of a current subframe according to a TPC adjustment value of the current subframe may include:

when the current subframe and a previous subframe of the current subframe are corresponding to different base stations, determining, by the UE, the power offset of the current subframe according to a power offset of a previous subframe that is of the current subframe and is corresponding to a same base station as the current subframe, the TPC cumulative value of the current subframe, and a preset second static adjustment value; or when the current subframe and a previous subframe of the current subframe are corresponding to a same base station, determining, by the UE, the power offset of the current subframe according to a power offset of the previous subframe of the current subframe and the TPC cumulative value of the current subframe.

In a fifth possible implementation manner, the TPC adjustment value is a TPC cumulative value, and the determining, by the UE, a power offset of a current subframe according to a TPC adjustment value of the current subframe may include:

when the current subframe and a previous subframe of the current subframe are corresponding to different base stations, determining, by the UE, the TPC cumulative value of the current subframe as the power offset of the current subframe; or when the current subframe and a previous subframe of the current subframe are corresponding to a same base station, determining, by the UE, the power offset of the current subframe according to a power offset of the previous subframe of the current subframe and the TPC cumulative value of the current subframe.

In a sixth possible implementation manner, the TPC adjustment value is a TPC absolute value, and the determining, by the UE, a power offset of a current subframe according to a TPC adjustment value of the current subframe may include:

determining, by the UE, the TPC absolute value of the current subframe as the power offset of the current subframe.

In a seventh possible implementation manner, when the current subframe and a previous subframe of the current subframe are corresponding to different base stations, the TPC adjustment value is a TPC absolute value; or when the current subframe and a previous subframe of the current subframe are corresponding to a same base station, the TPC adjustment value is a TPC cumulative value; and the determining, by the UE, a power offset of a current subframe according to a TPC adjustment value of the current subframe may include:

when the current subframe and the previous subframe of the current subframe are corresponding to different base stations, determining, by the UE, the TPC absolute value of the current subframe as the power offset of the current subframe;

when the current subframe and the previous subframe of the current subframe are corresponding to a same base station, and a TPC adjustment value of the previous subframe of the current subframe is a TPC absolute value, determining, by the UE, the TPC cumulative value of the current subframe as the power offset of the current subframe; or when the current subframe and the previous subframe of the current subframe are corresponding to a same base station, and a TPC adjustment value of the previous subframe of the current subframe is a TPC cumulative value, determining, by the UE, the power offset of the current subframe according to a power offset of the previous subframe of the current subframe and the TPC cumulative value of the current subframe.

Step 405: The UE determines uplink transmit power of the current subframe according to a static power control parameter corresponding to a base station corresponding to the current subframe and the power offset of the current subframe.

For an uplink transmit power control formula of a PUCCH, refer to the foregoing formula 1.

For a transmit power control formula of a PUSCH, refer to formula 2 and formula 3.

In this embodiment, UE determines a power offset of a current subframe according to a TPC adjustment value of the current subframe, and determines uplink transmit power of the current subframe according to a static power control parameter corresponding to a base station corresponding to the current subframe and the power offset of the current subframe; therefore, in a case in which the UE is connected to at least two base stations, control over transmit power of the UE in the case of dual connectivity is implemented.

Figure 5:
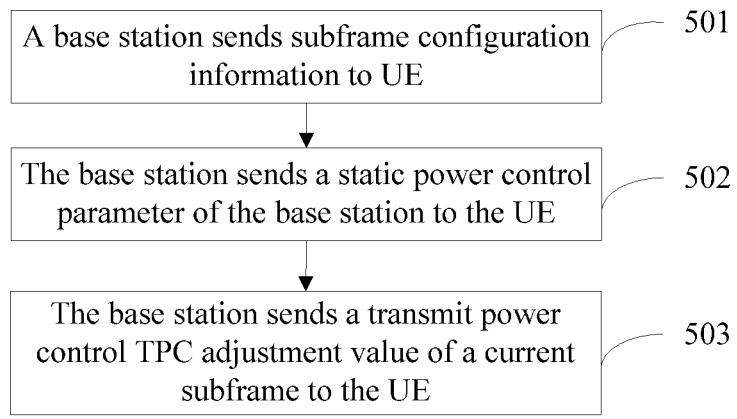
FIG. 5 is a schematic diagram of a third embodiment of a method for controlling uplink transmit power of UE according to the present invention.

Referring to FIG. 5, FIG. 5 is a schematic diagram of a third embodiment of a method for controlling uplink transmit power of UE according to an embodiment of the present invention, and the method includes:

Step 501: A base station sends subframe configuration information to UE, where the subframe configuration information is used to indicate base stations corresponding to all subframes in a radio frame.

The base station in this embodiment of the present invention is any base station of at least two base stations that the UE is connected to.

Step 502: The base station sends a static power control parameter of the base station to the UE.

Optionally, the base station may further send, to the UE, static power control parameters of one or more base stations that the UE is connected to.

Step 503: The base station sends a transmit power control TPC adjustment value of a current subframe to the UE, so that the UE determines uplink transmit power of the current subframe according to the static power control parameter and the TPC adjustment value, where the current subframe is a subframe that is of subframes of the UE and that is corresponding to the base station.

For description of how the UE determines uplink transmit power of a subframe according to a TPC adjustment value of the subframe, reference may be made to related description in embodiments shown in FIG. 3 and FIG. 4, and details are not described herein again.

In this embodiment, a base station sends subframe configuration information to UE, sends a static power control parameter of the base station to the UE, and sends a transmit power control TPC adjustment value of a current subframe to the UE, so that the UE determines uplink transmit power of the current subframe according to the static power control parameter and the TPC adjustment value; therefore, in a case in which the UE is connected to at least two base stations, control over uplink transmit power of the UE is implemented.

Figure 6:
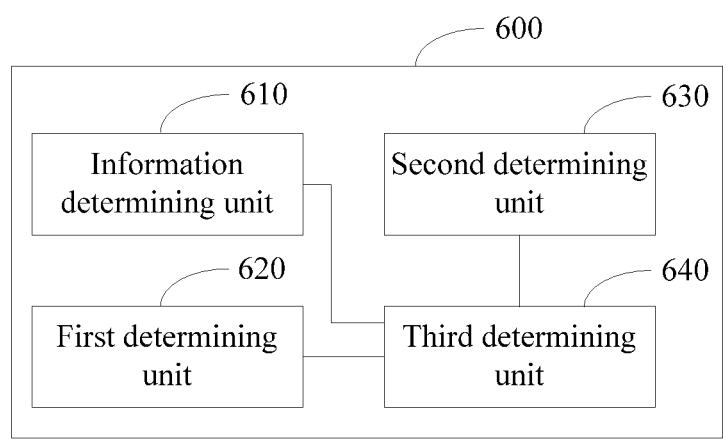
FIG. 6 is a schematic diagram of an embodiment of an apparatus for controlling uplink transmit power of UE according to the present invention.

Corresponding to the foregoing methods, an embodiment of the present invention further provides an apparatus for controlling uplink transmit power of UE. Referring to FIG. 6, an apparatus 600 includes:

an information determining unit 610, configured to determine subframe configuration information, where the subframe configuration information is used to indicate base stations corresponding to all subframes in a radio frame;

a first determining unit 620, configured to determine static power control parameters corresponding to all the base stations;

a second determining unit 630, configured to determine a TPC adjustment value of a current subframe; and a third determining unit 640, configured to: determine, according to the subframe configuration information determined by the information determining unit 610 and the static power control parameters that are corresponding to all the base stations and that are determined by the first determining unit 620, a static power control parameter corresponding to a base station corresponding to the current subframe; and determine uplink transmit power of the current subframe according to the static power control parameter corresponding to the base station corresponding to the current subframe and the TPC adjustment value that is of the current subframe and that is determined by the second determining unit 630.

Preferably, the third determining unit 640 may include:

a first determining subunit, configured to determine a power offset of the current subframe according to the TPC adjustment value of the current subframe; and a second determining subunit, configured to: determine, according to the subframe configuration information determined by the information determining unit 610 and the static power control parameters that are corresponding to all the base stations and that are determined by the first determining unit, the static power control parameter corresponding to the base station corresponding to the current subframe; and determine the uplink transmit power of the current subframe according to the static power control parameter corresponding to the base station corresponding to the current subframe and the power offset of the current subframe.

In a first possible implementation manner, the TPC adjustment value is a TPC cumulative value, and the first determining subunit may be specifically configured to:

determine the power offset of the current subframe according to a power offset of a previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

In a second possible implementation manner, the TPC adjustment value is a TPC cumulative value, and the first determining subunit may be specifically configured to:

when the current subframe and a previous subframe of the current subframe are corresponding to different base stations, determine the power offset of the current subframe according to a power offset of the previous subframe of the current subframe, the TPC cumulative value of the current subframe, and a preset first static adjustment value; or when the current subframe and a previous subframe of the current subframe are corresponding to a same base station, determine the power offset of the current subframe according to a power offset of the previous subframe of the current subframe and the TPC cumulative value of the current subframe.

In a third possible implementation manner, the TPC adjustment value is a TPC cumulative value, and the first determining subunit may be specifically configured to:

when the current subframe and a previous subframe of the current subframe are corresponding to different base stations, determine the power offset of the current subframe according to a power offset of a previous subframe that is of the current subframe and is corresponding to a same base station as the current subframe, and the TPC cumulative value of the current subframe; or when the current subframe and a previous subframe of the current subframe are corresponding to a same base station, determine the power offset of the current subframe according to a power offset of the previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

In a fourth possible implementation manner, the TPC adjustment value is a TPC cumulative value, and the first determining subunit may be specifically configured to:

when the current subframe and a previous subframe of the current subframe are corresponding to different base stations, determine the power offset of the current subframe according to a power offset of a previous subframe that is of the current subframe and is corresponding to a same base station as the current subframe, the TPC cumulative value of the current subframe, and a preset second static adjustment value; or when the current subframe and a previous subframe of the current subframe are corresponding to a same base station, determine the power offset of the current subframe according to a power offset of the previous subframe of the current subframe and the TPC cumulative value of the current subframe.

In a fifth possible implementation manner, the TPC adjustment value is a TPC cumulative value, and the first determining subunit may be specifically configured to:

when the current subframe and a previous subframe of the current subframe are corresponding to different base stations, determine the TPC cumulative value of the current subframe as the power offset of the current subframe; or when the current subframe and a previous subframe of the current subframe are corresponding to a same base station, determine the power offset of the current subframe according to a power offset of the previous subframe of the current subframe and the TPC cumulative value of the current subframe.

In a sixth possible implementation manner, the TPC adjustment value is a TPC absolute value, and the first determining subunit may be specifically configured to:

determine the TPC absolute value of the current subframe as the power offset of the current subframe.

In a seventh possible implementation manner, when the current subframe and a previous subframe of the current subframe are corresponding to different base stations, the TPC adjustment value is a TPC absolute value; or when the current subframe and a previous subframe of the current subframe are corresponding to a same base station, the TPC adjustment value is a TPC cumulative value; and the first determining subunit may be specifically configured to:

when the current subframe and the previous subframe of the current subframe are corresponding to different base stations, determine the TPC absolute value of the current subframe as the power offset of the current subframe;

when the current subframe and the previous subframe of the current subframe are corresponding to a same base station, and a TPC adjustment value of the previous subframe of the current subframe is a TPC absolute value, determine the TPC cumulative value of the current subframe as the power offset of the current subframe; or when the current subframe and the previous subframe of the current subframe are corresponding to a same base station, and a TPC adjustment value of the previous subframe of the current subframe is a TPC cumulative value, determine the power offset of the current subframe according to a power offset of the previous subframe of the current subframe and the TPC cumulative value of the current subframe.

Preferably, static power control parameters corresponding to different base stations are the same or different.

In this embodiment, subframe configuration information is determined, where the subframe configuration information is used to indicate base stations corresponding to all subframes in a radio frame; static power control parameters corresponding to all the base stations are determined; a TPC adjustment value of a current subframe is determined; uplink transmit power of the current subframe is determined according to a static power control parameter corresponding to a base station corresponding to the current subframe and the TPC adjustment value of the current subframe. Therefore, uplink transmit power of UE in all the subframes can be determined; because all the subframes are corresponding to different base stations, in a case in which the UE is connected to at least two base stations, control over uplink transmit power required when the UE sends data to different base stations can be implemented.

Figure 7:
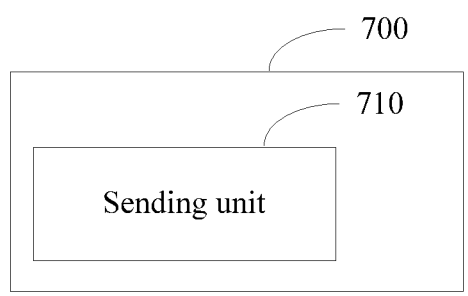
FIG. 7 is a schematic diagram of another embodiment of an apparatus for controlling uplink transmit power of UE according to the present invention.

Referring to FIG. 7, FIG. 7 is another structural diagram of an apparatus for controlling uplink transmit power according to an embodiment of the present invention. The apparatus may be disposed in a base station. An apparatus 700 includes:

a sending unit 710, configured to: send subframe configuration information to UE, where the subframe configuration information is used to indicate base stations corresponding to all subframes in a radio frame; send a static power control parameter of the base station to the UE, where the base station is one base station of the at least two base stations; and send a transmit power control TPC adjustment value of a current subframe to the UE, so that the UE determines uplink transmit power of the current subframe according to the static power control parameter and the TPC adjustment value, where the current subframe is a subframe that is of subframes of the UE and that is corresponding to the base station.

Optionally, the sending unit 710 may be further configured to: send, to the UE, static power control parameters of one or more base stations, except the base station, to which the UE is connected.

In this embodiment, a base station sends subframe configuration information to UE, sends a static power control parameter of the base station to the UE, and sends a transmit power control TPC adjustment value of a current subframe to the UE, so that the UE determines uplink transmit power of the current subframe according to the static power control parameter and the TPC adjustment value; therefore, in a case in which the UE is connected to at least two base stations, control over uplink transmit power of the UE is implemented.

Figure 8:
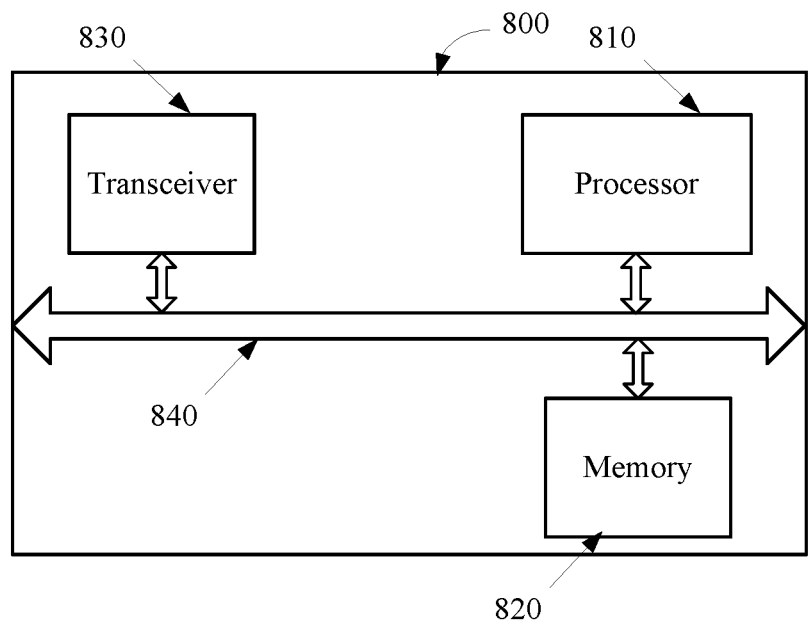
FIG. 8 is a schematic structural diagram of UE according to the present invention.

Referring to FIG. 8, FIG. 8 is a schematic structural diagram of UE according to an embodiment of the present invention. UE 800 includes a processor 810, a memory 820, a transceiver 830, and a bus 840.

The processor 810, the memory 820, and the transceiver 830 are connected to each other by using the bus 840; the bus 840 may be an ISA bus, a PCI bus, an EISA bus, or the like. The bus may be classified into an address bus, a data bus, a control bus, and the like. For ease of representation, only one thick line is used in FIG. 8 to represent the bus; however, it does not indicate that there is only one bus or only one type of bus.

The memory 820 is configured to store a program. Specifically, the program may include program code, where the program code includes a computer operation instruction. The memory 820 may include a high-speed RAM memory, and may further include a non-volatile memory (non-volatile memory), for example, at least one magnetic disk storage.

The transceiver 830 is configured to be connected to another device and communicate with the another device.

The processor 810 executes the program code, and is configured to: determine subframe configuration information, where the subframe configuration information is used to indicate base stations corresponding to all subframes in a radio frame; determine static power control parameters corresponding to all the base stations; determine a TPC adjustment value of a current subframe; and determine uplink transmit power of the current subframe according to a static power control parameter corresponding to a base station corresponding to the current subframe and the TPC adjustment value of the current subframe.

Preferably, the processor 810 may be specifically configured to:

determine a power offset of the current subframe according to the TPC adjustment value of the current subframe; and determine the uplink transmit power of the current subframe according to the static power control parameter corresponding to the base station corresponding to the current subframe and the power offset of the current subframe.

In a first possible implementation manner, the TPC adjustment value is a TPC cumulative value, and the processor 810 may be specifically configured to:

determine the power offset of the current subframe according to a power offset of a previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

In a second possible implementation manner, the TPC adjustment value is a TPC cumulative value, and the processor 810 may be specifically configured to:

when the current subframe and a previous subframe of the current subframe are corresponding to different base stations, determine the power offset of the current subframe according to a power offset of the previous subframe of the current subframe, the TPC cumulative value of the current subframe, and a preset first static adjustment value; or when the current subframe and a previous subframe of the current subframe are corresponding to a same base station, determine the power offset of the current subframe according to a power offset of the previous subframe of the current subframe and the TPC cumulative value of the current subframe.

In a third possible implementation manner, the TPC adjustment value is a TPC cumulative value, and the processor 810 may be specifically configured to:

when the current subframe and a previous subframe of the current subframe are corresponding to different base stations, determine the power offset of the current subframe according to a power offset of a previous subframe that is of the current subframe and is corresponding to a same base station as the current subframe, and the TPC cumulative value of the current subframe; or when the current subframe and a previous subframe of the current subframe are corresponding to a same base station, determine the power offset of the current subframe according to a power offset of the previous subframe of the current subframe and the TPC cumulative value of the current subframe, where a value range that is of the TPC cumulative value of the current subframe and that exists when the current subframe and the previous subframe of the current subframe are corresponding to different base stations is greater than a value range that is of the TPC cumulative value of the current subframe and that exists when the current subframe and the previous subframe are corresponding to a same base station.

In a fourth possible implementation manner, the TPC adjustment value is a TPC cumulative value, and the processor 810 may be specifically configured to:

when the current subframe and a previous subframe of the current subframe are corresponding to different base stations, determine the power offset of the current subframe according to a power offset of a previous subframe that is of the current subframe and is corresponding to a same base station as the current subframe, the TPC cumulative value of the current subframe, and a preset second static adjustment value; or when the current subframe and a previous subframe of the current subframe are corresponding to a same base station, determine the power offset of the current subframe according to a power offset of the previous subframe of the current subframe and the TPC cumulative value of the current subframe.

In a fifth possible implementation manner, the TPC adjustment value is a TPC cumulative value, and the processor 810 may be specifically configured to:

when the current subframe and a previous subframe of the current subframe are corresponding to different base stations, determine the TPC cumulative value of the current subframe as the power offset of the current subframe; or when the current subframe and a previous subframe of the current subframe are corresponding to a same base station, determine the power offset of the current subframe according to a power offset of the previous subframe of the current subframe and the TPC cumulative value of the current subframe.

In a sixth possible implementation manner, the TPC adjustment value is a TPC absolute value, and the processor 810 may be specifically configured to:

determine the TPC absolute value of the current subframe as the power offset of the current subframe.

In a seventh possible implementation manner, when the current subframe and a previous subframe of the current subframe are corresponding to different base stations, the TPC adjustment value is a TPC absolute value; or when the current subframe and a previous subframe of the current subframe are corresponding to a same base station, the TPC adjustment value is a TPC cumulative value; and the processor 810 may be specifically configured to:

when the current subframe and the previous subframe of the current subframe are corresponding to different base stations, determine the TPC absolute value of the current subframe as the power offset of the current subframe;

when the current subframe and the previous subframe of the current subframe are corresponding to a same base station, and a TPC adjustment value of the previous subframe of the current subframe is a TPC absolute value, determine the TPC cumulative value of the current subframe as the power offset of the current subframe; or when the current subframe and the previous subframe of the current subframe are corresponding to a same base station, and a TPC adjustment value of the previous subframe of the current subframe is a TPC cumulative value, determine the power offset of the current subframe according to a power offset of the previous subframe of the current subframe and the TPC cumulative value of the current subframe.

Preferably, static power control parameters corresponding to different base stations are the same or different.

In this embodiment, subframe configuration information is determined, where the subframe configuration information is used to indicate base stations corresponding to all subframes in a radio frame; static power control parameters corresponding to all the base stations are determined; a TPC adjustment value of a current subframe is determined; uplink transmit power of the current subframe is determined according to a static power control parameter corresponding to a base station corresponding to the current subframe and the TPC adjustment value of the current subframe. Therefore, uplink transmit power of UE in all the subframes can be determined; because all the subframes are corresponding to different base stations, in a case in which the UE is connected to at least two base stations, control over transmit power required when the UE sends data to different base stations can be implemented.

Figure 9:
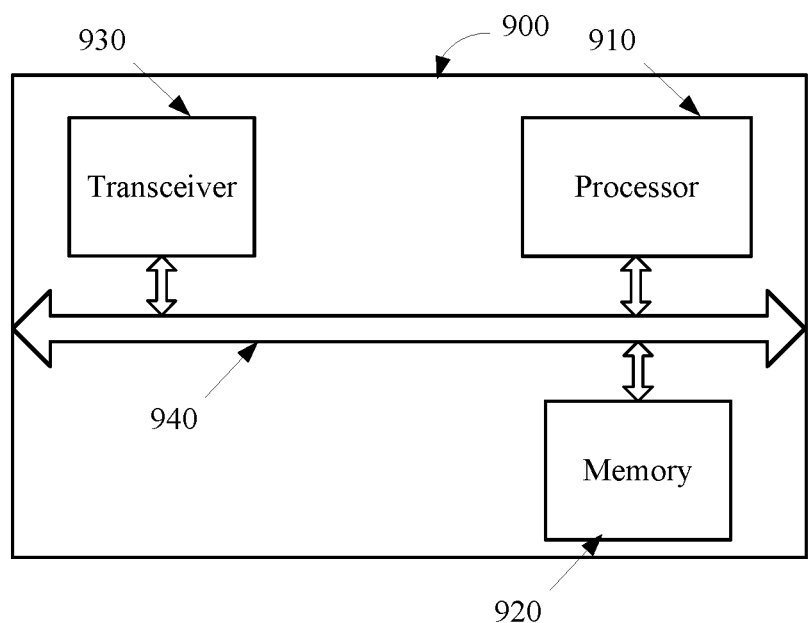
FIG. 9 is a schematic structural diagram of a base station according to the present invention.

Referring to FIG. 9, FIG. 9 is a schematic structural diagram of a base station according to an embodiment of the present invention. A base station 900 includes a processor 910, a memory 920, a transceiver 930, and a bus 940.

The processor 910, the memory 920, and the transceiver 930 are connected to each other by using the bus 940; the bus 940 may be an ISA bus, a PCI bus, an EISA bus, or the like. The bus may be classified into an address bus, a data bus, a control bus, and the like. For ease of representation, only one thick line is used in FIG. 9 to represent the bus; however, it does not indicate that there is only one bus or only one type of bus.

The memory 920 is configured to store a program. Specifically, the program may include program code, where the program code includes a computer operation instruction. The memory 920 may include a high-speed RAM memory, and may further include a non-volatile memory (non-volatile memory), for example, at least one magnetic disk storage.

The processor 910 executes the program code.

The transceiver 930 is configured to be connected to another device, and communicate with the another device; the transceiver 930 is configured to: send subframe configuration information to UE, where the subframe configuration information is used to indicate base stations corresponding to all subframes in a radio frame; send a static power control parameter of the base station to the UE; and send a transmit power control TPC adjustment value of a current subframe to the UE, so that the UE determines uplink transmit power of the current subframe according to the static power control parameter and the TPC adjustment value, where the current subframe is a subframe that is of subframes of the UE and that is corresponding to the base station.

Optionally, the transceiver 930 may be further configured to: send, to the UE, static power control parameters of one or more base stations, except the base station, to which the UE is connected.

In this embodiment, a base station sends subframe configuration information to UE, sends a static power control parameter of the base station to the UE, and sends a transmit power control TPC adjustment value of a current subframe to the UE, so that the UE determines uplink transmit power of the current subframe according to the static power control parameter and the TPC adjustment value; therefore, in a case in which the UE is connected to at least two base stations, control over uplink transmit power of the UE is implemented.

A person skilled in the art may clearly understand that, the technologies in the embodiments of the present invention may be implemented by software in addition to a necessary general hardware platform. Based on such an understanding, the technical solutions in the embodiments of the present invention essentially, or the part contributing to the prior art may be implemented in the form of a software product. The computer software product is stored in a storage medium, such as an ROM/RAM, a magnetic disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method for controlling uplink transmit power of a user equipment (UE) connected to at least two base stations, the method comprising:
    determining subframe configuration information, wherein the subframe configuration information indicates base stations corresponding to all subframes in a radio frame;
    determining static power control parameters corresponding to all of the base stations;
    determining a transmit power control (TPC) adjustment value of a current subframe according to whether the current subframe and a previous subframe correspond to a same base station; and
    determining uplink transmit power of the current subframe according to a static power control parameter corresponding to a base station corresponding to the current subframe and the TPC adjustment value of the current subframe.

2. The method according to claim 1, wherein the determining uplink transmit power of the current subframe comprises:
    determining a power offset of the current subframe according to the TPC adjustment value of the current subframe; and
    determining the uplink transmit power of the current subframe according to the static power control parameter corresponding to the base station corresponding to the current subframe and the power offset of the current subframe.

3. The method according to claim 2, wherein the TPC adjustment value is a TPC cumulative value;
    wherein the determining a power offset of the current subframe according to the TPC adjustment value of the current subframe comprises determining the power offset of the current subframe according to an offset of the previous subframe and further according to the TPC cumulative value of the current subframe; and
    wherein a value range that is of the TPC cumulative value of the current subframe and that exists when the current subframe and the previous subframe are corresponding to different base stations is greater than a value range that is of the TPC cumulative value of the current subframe and that exists when the current subframe and the previous subframe correspond to the same base station.

4. The method according to claim 2, wherein the TPC adjustment value is a TPC cumulative value; and
    wherein the determining a power offset of the current subframe according to the TPC adjustment value of the current subframe comprises performing at least one of:
        determining, when the current subframe and the previous subframe correspond to different base stations, the power offset of the current subframe according to a power offset of the previous subframe of the current subframe, the TPC cumulative value of the current subframe, and a preset first static adjustment value; or
        determining, when the current subframe and the previous subframe correspond to the same base station, the power offset of the current subframe according to a power offset of the previous subframe of the current subframe and the TPC cumulative value of the current subframe.

5. The method according to claim 2, wherein the TPC adjustment value is a TPC cumulative value;
    wherein the determining a power offset of the current subframe according to the TPC adjustment value of the current subframe comprises performing at least one of:
        determining, when the current subframe and the previous subframe correspond to different base stations, the power offset of the current subframe according to a power offset of the previous subframe and is corresponding to the same base station as the current subframe, and the TPC cumulative value of the current subframe; or
        determining, when the current subframe and the previous subframe correspond to the same base station, the power offset of the current subframe according to a power offset of the previous subframe of the current subframe and the TPC cumulative value of the current subframe; and
    wherein a value range that is of the TPC cumulative value of the current subframe and that exists when the current subframe and the previous subframe correspond to different base stations is greater than a value range that is of the TPC cumulative value of the current subframe and that exists when the current subframe and the previous subframe correspond to the same base station.

6. The method according to claim 2, wherein the TPC adjustment value is a TPC cumulative value; and
    wherein the determining a power offset of the current subframe according to the TPC adjustment value of the current subframe comprises performing at least one of:
        determining, when the current subframe and the previous subframe correspond to different base stations, the power offset of the current subframe according to a power offset of the previous subframe corresponding to the same base station as the current subframe, the TPC cumulative value of the current subframe, and a preset second static adjustment value; or
        determining, when the current subframe and the previous subframe of the current subframe correspond to the same base station, the power offset of the current subframe according to a power offset of the previous subframe and the TPC cumulative value of the current subframe.

7. The method according to claim 2, wherein the TPC adjustment value is a TPC cumulative value; and
wherein the determining a power offset of the current subframe according to the TPC adjustment value of the current subframe comprises performing at least one of:
determining, when the current subframe and the previous subframe correspond to different base stations, the TPC cumulative value of the current subframe as the power offset of the current subframe; or
determining, when the current subframe and the previous subframe of the current subframe correspond to the same base station, the power offset of the current subframe according to a power offset of the previous subframe and the TPC cumulative value of the current subframe.

8. The method according to claim 2, wherein the TPC adjustment value is a TPC absolute value; and
wherein the determining a power offset of the current subframe according to the TPC adjustment value of the current subframe comprises determining the TPC absolute value of the current subframe as the power offset of the current subframe.

9. The method according to claim 2, wherein, when the current subframe and the previous subframe correspond to different base stations, the TPC adjustment value is a TPC absolute value;
wherein, when the current subframe and the previous subframe correspond to the same base station, the TPC adjustment value is a TPC cumulative value; and
wherein the determining a power offset of the current subframe according to the TPC adjustment value of the current subframe comprises performing at least one of:
determining, when the current subframe and the previous subframe correspond to different base stations, the TPC absolute value of the current subframe as the power offset of the current subframe;
determining, when the current subframe and the previous subframe correspond to the same base station, and a TPC adjustment value of the previous subframe is a TPC absolute value, the TPC cumulative value of the current subframe as the power offset of the current subframe; or
determining, when the current subframe and the previous subframe of the current subframe correspond to the same base station, and a TPC adjustment value of the previous subframe is a TPC cumulative value, the power offset of the current subframe according to a power offset of the previous subframe and the TPC cumulative value of the current subframe.

10. A user equipment (UE), wherein the UE is connected to at least two base stations, the UE comprising:
a processor; and
a non-transitory computer-readable storage medium storing a program to be executed by the processor, the program including instructions to:
determine subframe configuration information, wherein the subframe configuration information indicates base stations corresponding to all subframes in a radio frame;
determine static power control parameters corresponding to all of the base stations;
determine a transmit power control (TPC) adjustment value of a current subframe according to whether the current subframe and a previous subframe correspond to a same base station; and
determine uplink transmit power of the current subframe according to a static power control parameter corresponding to a base station corresponding to the current subframe and further according to the TPC adjustment value of the current subframe.

11. The UE according to claim 10, wherein the program further includes instructions to:
determine a power offset of the current subframe according to the TPC adjustment value of the current subframe; and
determine the uplink transmit power of the current subframe according to the static power control parameter corresponding to the base station corresponding to the current subframe and the power offset of the current subframe.

12. The UE according to claim 11, wherein the TPC adjustment value is a TPC cumulative value;
wherein the program further includes instructions to determine the power offset of the current subframe according to an offset of the previous subframe and the TPC cumulative value of the current subframe; and
wherein a value range that is of the TPC cumulative value of the current subframe and that exists when the current subframe and the previous subframe correspond to different base stations is greater than a value range that is of the TPC cumulative value of the current subframe and that exists when the current subframe and the previous subframe correspond to the same base station.

13. The UE according to claim 11, wherein the TPC adjustment value is a TPC cumulative value; and
wherein the program further includes instructions to perform at least one of:
determine, when the current subframe and the previous subframe correspond to different base stations, the power offset of the current subframe according to a power offset of the previous subframe, the TPC cumulative value of the current subframe, and a preset first static adjustment value; or
determine, when the current subframe and the previous subframe correspond to the same base station, the power offset of the current subframe according to a power offset of the previous subframe and the TPC cumulative value of the current subframe.

14. The UE according to claim 11, wherein the TPC adjustment value is a TPC cumulative value;
wherein the program further includes instructions to perform at least one of:
determine, when the current subframe and the previous subframe correspond to different base stations, the power offset of the current subframe according to a power offset of the previous subframe that corresponds to the same base station as the current subframe, and the TPC cumulative value of the current subframe; or
determine, when the current subframe and the previous subframe corresponds to the same base station, the power offset of the current subframe according to a power offset of the previous subframe and the TPC cumulative value of the current subframe; and
wherein a value range that is of the TPC cumulative value of the current subframe and that exists when the current subframe and the previous subframe correspond to different base stations is greater than a value range that is of the TPC cumulative value of the current subframe and that exists when the current subframe and the previous subframe correspond to the same base station.

15. The UE according to claim 11, wherein the TPC adjustment value is a TPC cumulative value; and
wherein the program further includes instructions to perform at least one of:
determine, when the current subframe and the previous subframe of the current subframe are corresponding to different base stations, the power offset according to a power offset of the previous subframe that corresponds to the same base station as the current subframe, the TPC cumulative value of the current subframe, and a preset second static adjustment value; or
determine, when the current subframe and the previous subframe correspond to the same base station, the power offset of the current subframe according to a power offset of the previous subframe and the TPC cumulative value of the current subframe.

16. The UE according to claim 11, wherein the TPC adjustment value is a TPC cumulative value; and
wherein the program further includes instructions to perform at least one of:
determine, when the current subframe and the previous subframe correspond to different base stations, the TPC cumulative value of the current subframe as the power offset of the current subframe; or
determine, when the current subframe and the previous subframe correspond to the same base station, the power offset of the current subframe according to a power offset of the previous subframe and the TPC cumulative value of the current subframe.

17. The UE according to claim 11, wherein the TPC adjustment value is a TPC absolute value; and
wherein the program further includes instructions to determine the TPC absolute value of the current subframe as the power offset of the current subframe.

18. The UE according to claim 11, wherein, when the current subframe and the previous subframe correspond to different base stations, the TPC adjustment value is a TPC absolute value;
wherein, when the current subframe and the previous subframe of the current subframe are corresponding to the same base station, the TPC adjustment value is a TPC cumulative value; and
wherein the program further includes instructions to perform at least one of:
determine, when the current subframe and the previous subframe correspond to different base stations, the TPC absolute value of the current subframe as the power offset of the current subframe;
determine, when the current subframe and the previous subframe correspond to the same base station, and a TPC adjustment value of the previous subframe is a TPC absolute value, the TPC cumulative value of the current subframe as the power offset of the current subframe; or
determine, when the current subframe and the previous subframe correspond to the same base station, and a TPC adjustment value of the previous subframe is a TPC cumulative value, the power offset of the current subframe according to a power offset of the previous subframe and the TPC cumulative value of the current subframe.

19. A method for controlling uplink transmit power of user equipment (UE) connected to at least two base stations, the method comprising:
sending subframe configuration information to the UE, wherein the subframe configuration information indicates base stations corresponding to all subframes in a radio frame;
sending a static power control parameter of a base station to the UE, wherein the base station is one base station of the at least two base stations; and
sending a transmit power control (TPC) adjustment value of a current subframe to the UE, so that the UE determines uplink transmit power of the current subframe according to the static power control parameter and the TPC adjustment value and further according to whether the current subframe and a previous subframe correspond to a same base station, wherein the current subframe is a subframe that is of subframes of the UE and that corresponds to the base station.

20. The method according to claim 19, further comprising:
sending, to the UE, static power control parameters of other base stations, except the base station to which the UE is connected.

21. A base station, comprising:
a transceiver, configured to:
send subframe configuration information to UE, wherein the subframe configuration information indicates base stations corresponding to all subframes in a radio frame; send a static power control parameter of the base station to the UE; and
send a transmit power control TPC adjustment value of a current subframe to the UE, so that the UE determines uplink transmit power of the current subframe according to the static power control parameter and the TPC adjustment value and further according to whether the current subframe and a previous subframe correspond to a same base station, wherein the current subframe is a subframe that is of subframes of the UE and that corresponds to the base station.

22. The base station according to claim 21, wherein the transceiver is further configured to send, to the UE, static power control parameters of one or more base stations, except the base station to which the UE is connected.

* * * * *